United States Patent
Reese et al.

(10) Patent No.: US 9,879,114 B2
(45) Date of Patent: Jan. 30, 2018

(54) PROCESS FOR THE PRODUCTION OF LOW MOLECULAR WEIGHT POLYOXYALKYLENE POLYOLS

(71) Applicant: Covestro LLC, Pittsburgh, PA (US)

(72) Inventors: Jack R. Reese, Coraopolis, PA (US); Phillip E. Bowles, North Fort Myers, FL (US); Edward P. Browne, Cologne (DE)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 14/978,079

(22) Filed: Dec. 22, 2015

(65) Prior Publication Data

US 2017/0174834 A1   Jun. 22, 2017

(51) Int. Cl.
*C08G 65/10* (2006.01)
*B01J 37/26* (2006.01)
*C08G 65/26* (2006.01)

(52) U.S. Cl.
CPC .............. *C08G 65/10* (2013.01); *B01J 37/26* (2013.01); *C08G 65/2663* (2013.01); *C08G 65/2696* (2013.01)

(58) Field of Classification Search
None
See application file for complete search history.

(56) References Cited

U.S. PATENT DOCUMENTS

| | | |
|---|---|---|
| 5,689,012 A | 11/1997 | Pazos et al. |
| 5,777,177 A | 7/1998 | Pazos |
| 5,919,988 A | 7/1999 | Pazos et al. |
| 6,077,978 A | 6/2000 | McDaniel et al. |
| 6,359,101 B1 | 3/2002 | O'Connor et al. |
| 6,835,801 B2 | 12/2004 | Hayes |
| 7,919,575 B2 | 4/2011 | Browne |
| 2003/0004378 A1 | 1/2003 | Ostrowski et al. |
| 2003/0013920 A1 | 1/2003 | Ostrowski et al. |
| 2003/0013921 A1 | 1/2003 | Ostrowski et al. |
| 2005/0107643 A1* | 5/2005 | Ostrowski .......... C08G 18/4866 568/679 |
| 2005/0209438 A1 | 9/2005 | Browne |
| 2008/0021191 A1 | 1/2008 | Reese et al. |
| 2010/0324340 A1 | 12/2010 | Pazos et al. |
| 2013/0345476 A1 | 12/2013 | Reese |
| 2014/0275312 A1 | 9/2014 | Reese et al. |
| 2014/0275313 A1 | 9/2014 | Brown et al. |
| 2014/0275633 A1 | 9/2014 | Reese et al. |

\* cited by examiner

*Primary Examiner* — Sudhakar Katakam
*Assistant Examiner* — Ana Z Muresan
(74) *Attorney, Agent, or Firm* — N. Denise Brown

(57) ABSTRACT

This invention relates to a semi-batch process for producing low molecular weight polyoxyalkylene polyols. These polyoxyalkylene polyols are characterized by hydroxyl numbers of from 200 to 500. In accordance with the invention, the first alkylene oxide block used to activate the DMC catalyst comprises from 50% to 100% by weight of propylene oxide and from 0% to 50% by weight of ethylene oxide; and the second alkylene oxide block comprises from 50% to 100% by weight of propylene oxide and from 0% to 50% by weight of ethylene oxide. A continuously added starter is present. Optionally, a third alkylene oxide block can be added. The addition of the second alkylene oxide block and of the third alkylene oxide block when present is completed with a space time yield of greater than or equal to 250 $kg/m^3/hr$.

14 Claims, No Drawings

PROCESS FOR THE PRODUCTION OF LOW MOLECULAR WEIGHT POLYOXYALKYLENE POLYOLS

BACKGROUND OF THE INVENTION

The present invention relates to a semi-batch process for the production of low molecular weight polyoxyalkylene polyols. This semi-batch process oxyalkylates one or more starters in the presence of a DMC catalyst in which the alkylene oxide feed is completed with a space time yield of greater than or equal to 250 kg/m$^3$/hr.

The production of low molecular weight products is important as these can be used directly to replace products made using conventional KOH technology or these can be used as starters to make long chain IMPACT (DMC) or KOH products. One of the challenges of making low molecular weight products with DMC catalysts is deactivation of the catalyst. It is well known that deactivation of the DMC catalyst can be resolved by increasing the catalyst concentration. This is not desirable, however, due to the expense of the catalyst. It is preferred to maintain a constant catalyst level of 60 ppm or lower. It is also preferred to maintain the reaction temperature at 130° C. or lower to minimize potential negative effects of reaction temperature such as color formation.

One advantage of double metal cyanide catalysts is that they do not promote the rearrangement of propylene oxide into propenyl alcohol which acts as a monofunctional initiator in propylene oxide polymerization. The presence of propenyl alcohol promotes the formation of monoalcohols which are an impurity in the process.

Another advantage of double metal cyanide catalysts includes the ability to leave the catalyst residue in the product. This results in lower production cost since the catalyst residues do not have to be removed from the polyoxyalkylene polyol prior to use. This is also another reason that it is desirable to minimize the amount of catalyst used.

While double metal cyanide catalysts provide numerous advantages in preparing polyoxyalkylene polyols, there are, unfortunately, some disadvantages to this type of catalysis. These disadvantages include the tendency of the catalyst to deactivate in the presence of high concentrations of hydroxyl groups, the inability to polymerize in the presence of low molecular weight initiators such as glycerin, and the fact that, in addition to the desired product, DMC catalysts produce a small quantity of a very high molecular weight (i.e. at least 100,000 MW and higher) polymer. This high molecular weight polymer is commonly referred to as high molecular weight tail. High molecular weight tail causes difficulties with the foaming process when reacting a polyol with a polyisocyanate to produce a polyurethane foam.

There have been numerous efforts over the years to improve and extend double metal cyanide catalysis to enable effective oxyalkylation of low molecular weight starters such as glycerin, and to produce low molecular weight polyoxyalkylene polyols. The acidification of starters is one method found to be effective. Another method is to use starters with ultra-low water content.

Low molecular weight or high hydroxyl number polyoxyalkylene polyols are characterized by a high percentage of the starter used to make the final product. As an example, a 400 MW, glycerin based polyoxyalkylene polyol contains 23% by weight of glycerin and 77% by weight of alkylene oxide (weight percent based on the total product); whereas a 3000 MW, glycerin based polyoxyalkylene polyol contains 3% by weight of glycerin and 97% by weight of alkylene oxide (weight percent based on the total product). The 400 MW product requires an overall starter to alkylene oxide ratio of 0.3 while a 3000 MW product requires an overall starter to alkylene oxide ratio of 0.03. As used herein, the starter is the total weight of starter required and the alkylene oxide is the total weight of alkylene oxide required. The higher ratio of starter to alkylene oxide or higher concentration of starter required for the low molecular weight polyoxyalkylene polyols presents challenges in a DMC catalyzed process because of the tendency of the starters to inhibit the activity or deactivate the DMC catalyst. This reduction in activity or deactivation of the DMC catalyst is measured by a pressure increase in the semi-batch reaction caused by elevated free oxide concentration. Pressure increases are often observed after the low molecular starter is introduced to the reactor of a semi-batch process using a Continuous Addition of Starter (CAOS) approach to make low molecular weight polyoxyalklyene polyols. Typically, in such an approach the DMC catalyst is first activated in the presence of an initial starter or heel and reacted with alkylene oxides before the continuous starter is introduced. This is, known as a Pre-CAOS build ratio. The initial pressure increase observed after the introduction of the CAOS feed demonstrates that the DMC catalyst is not fully activated or becomes partially inhibited by the starter introduction. The Pre-CAOS build ratio is part of the process that allows the catalyst to become activated, and thus prevents the batch from completely deactivating. As the reach of DMC technology is extended to products having lower and lower molecular weights, one of the most significant hurdles to be overcome is the tendency of the system to deactivate via elevated free oxide content soon after a high instantaneous starter/alkylene oxide ratio feed commences, and before the catalyst has become fully active. Although extending the Pre-CAOS build ratio will help prevent this, it then becomes necessary to compensate for the delay by feeding at an even higher instantaneous starter/alkylene oxide ratio once the CAOS feed commences as the denominator has decreased. The instantaneous ratio is defined by the total continuous starter weight over the alkylene oxide weight fed during the continuous starter feed.

The second area where the pressure can increase quicker than usual demonstrating an increase in elevated free oxide concentration and thus a reduction in the catalyst activity is at the end of the CAOS feed. This indicates a gradual loss of catalyst activity during the main portion of the oxyalkoxylation as the catalyst concentration in the reaction media decreases.

Thus, a need exists for a method to accelerate the rate at which the DMC catalyst becomes active and a method to maintain catalyst activity. It has recently been discovered that a partial EO co-feed and/or increase in feed rates of alkylene oxides appear to do just that. The fact that EO and/or increased feed rates can accelerate DMC catalyst activation may lead to the development of processes for low molecular weight polyols that do not require special raw material handling (such as ultra-low water levels in the CAOS feeds) which can be difficult to meet on a commercial scale.

SUMMARY OF THE INVENTION

The invention relates to a semi-batch process for the production of low molecular weight polyoxyalkylene polyols. These polyoxyalkylene polyols have hydroxyl numbers of from 200 to 500. This process comprises:

(1) establishing a mixture of a double metal cyanide catalyst and an initial starter ($S_i$) in a reactor;

(2) activating said double metal cyanide catalyst with a first alkylene oxide block that comprises from 50% to 100% by weight of propylene oxide and 0% to 50% by weight of ethylene oxide, wherein the sum of the % by weight of propylene oxide and the % by weight of ethylene oxide totals 100% by weight of said first alkylene oxide block;

(3) adding a second alkylene oxide block into the reactor, wherein said second alkylene oxide block comprises from 50% to 100% by weight of propylene oxide and 0% to 50% by weight of ethylene oxide, wherein the sum of the % by weight of propylene oxide and the % by weight of ethylene oxide totals 100% by weight of said second alkylene oxide block;

(4) continuously introducing one or more starters ($S_c$) into the reactor;

(5) optionally, adding a third alkylene oxide block into the reactor, wherein the third alkylene oxide block comprises from 95 to 100% by weight of propylene oxide and from 0 to 5% by weight of ethylene oxide, wherein the sum of the % by weight of propylene oxide and the % by weight of ethylene oxide totals 100% by weight of the third alkylene oxide block;

(6) oxyalkylating the starters to form the low molecular weight polyoxyalkylene polyols;
and (7) completing the addition of the second alkylene oxide block which was started in (3), and, when present, of the third alkylene oxide block, with a space time yield of greater than or equal to 250 kg/m$^3$/hr.

In an embodiment of the present invention, steps (3) and (4) may be simultaneous.

In another embodiment of the invention, the continuous introduction of one or more starters ($S_c$) in step (4) may start after the addition of an alkylene oxide step (3) has started, if a pre-CAOS build ratio is used. In this embodiment, the CAOS feed ends at the same time as the addition of alkylene oxide in step (3) or it may continue after completion of the addition of alkylene oxide in step (3) is complete. When a third alkylene oxide block will not be added, the CAOS ($S_c$) feed can end before completion of the feed of the second alkylene oxide block, or it can end at the same time as when the feed of the second alkylene oxide block ends.

In accordance with the invention, when a third alkylene oxide block is added to the reactor in step (5), the addition of the second alkylene oxide block can be completed prior to the start of the third alkylene oxide block. Thus, the addition of the third alkylene oxide block follows completion of the addition of the second alkylene oxide block. The composition of the third alkylene oxide block contains less ethylene oxide than was present in the second alkylene oxide block.

In another embodiment of the invention when a third alkylene oxide block is added to the reactor, the CAOS feed which was started with or during the feed of the second alkylene oxide block continues at least until after the addition of the third alkylene oxide block has started. The CAOS feed may continue during the addition of the third alkylene oxide block, and it ends no later than the completion of the addition of the third alkylene oxide block.

In embodiments wherein a third alkylene oxide block is added, the combined addition of the second and third alkylene oxide blocks is completed with a space time yield of greater than or equal to 250 kg/m$^3$/hr.

DETAILED DESCRIPTION OF THE INVENTION

Various embodiments are described and illustrated herein to provide an overall understanding of the structure, function, operation, manufacture, and use of the disclosed products and processes. The various embodiments described and illustrated herein are non-limiting and non-exhaustive. Thus, the invention is not limited by the description of the various non-limiting and non-exhaustive embodiments disclosed herein. Rather, the invention is defined solely by the claims. The features and characteristics illustrated and/or described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. Therefore, any such amendments comply with the requirements of 35 U.S.C. §112 and 35 U.S.C. §132(a). The various embodiments disclosed and described in this specification can comprise, consist of, or consist essentially of the features and characteristics as variously described herein.

Any patent, publication, or other disclosure material identified herein is incorporated herein by reference in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference herein to "certain embodiments", "some embodiments", "various non-limiting embodiments," or the like, means that a particular feature or characteristic may be included in an embodiment. Thus, use of such phrases, and similar phrases, herein does not necessarily refer to a common embodiment, and may refer to different embodiments. Further, the particular features or characteristics may be combined in any suitable manner in one or more embodiments. Thus, the particular features or characteristics illustrated or described in connection with various embodiments may be combined, in whole or in part, with the features or characteristics of one or more other embodiments. Such modifications and variations are intended to be included within the scope of the present specification. In this manner, the various embodiments described in this specification are non-limiting and non-exhaustive.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification such that amending to expressly recite any such sub-ranges would comply with the requirements of 35 U.S.C. §112 and 35 U.S.C. §132(a).

The grammatical articles "a", "an", and "the", as used herein, are intended to include "at least one" or "one or more", unless otherwise indicated, even if "at least one" or "one or more" is expressly used in certain instances. Thus, the articles are used herein to refer to one or more than one (i.e., to "at least one") of the grammatical objects of the article. Further, the use of a singular noun includes the plural, and the use of a plural noun includes the singular, unless the context of the usage requires otherwise.

As used herein, "polymer" encompasses prepolymers, oligomers and both homopolymers and copolymers; the prefix "poly" in this context referring to two or more. As used herein, "molecular weight", when used in reference to a polymer, refers to the number average molecular weight ("Mn"), unless otherwise specified. Further, as will be appreciated, the Mn of a polymer containing functional groups, such as a polyol, can be calculated from the functional group number, such as hydroxyl number, which is determined by end-group analysis.

The low molecular weight polyoxyalkylene polyols produced by the presently claimed process are characterized by a hydroxyl number in the range of from 200 to 500 mgKOH/g. These polyoxyalkylene polyols have functionalities in the range of from 2 to 8.

The polyoxaylkylene polyether polyols produced by this process may also be described as typically having an OH number of from at least about 200, and preferably from at least about 250. These polyoxyalkylene polyether polyols also typically have an OH number of less than or equal to about 500, and preferably of less than or equal to about 350. The polyoxyalkylene polyether polyols may also have an OH number ranging between any combination of these upper and lower values, inclusive, such as, for example, from at least about 200 to less than or equal to about 500, and preferably from at least about 250 to less than or equal to about 350.

As is known by one skilled in the art, OH numbers of from about 200 to about 500 correspond to equivalent weights of about 280 to about 112, respectively; and OH numbers of from about 250 to about 350 correspond to equivalent weights of from about 225 to about 160, respectively.

Suitable double metal cyanide (DMC) catalysts to be used in the process of the present invention include, for example, any known DMC catalyst. These include both the crystalline and the substantially non-crystalline (i.e. substantially amorphous) DMC catalysts. Crystalline DMC catalysts are known and described in, for example, U.S. Pat. Nos. 5,158,922, 4,477,589, 3,427,334, 3,941,849 and 5,470,813. Double metal cyanide (DMC) catalysts which exhibit a substantially non-crystalline character (i.e. are substantially amorphous) are known and described in, for example, U.S. Pat. Nos. 5,482,908 and 5,783,513.

The catalysts disclosed in U.S. Pat. Nos. 5,482,908 and 5,783,513 differ from other DMC catalysts because these catalysts exhibit a substantially non-crystalline morphology. In addition, these catalysts are based on a combination of ligands, such as t-butyl alcohol and a polydentate ligand (polypropylene oxide polyol). Zinc hexacyanocobaltates are preferred DMC catalysts. Preferred DMC catalysts are the substantially amorphous catalysts.

The DMC catalyst concentration in the inventive process is chosen to ensure a good control of the polyoxyalkylation reaction under the given reaction conditions. The catalyst concentration is typically present in an amount of at least about 30 ppm, or at least about 45 ppm, or at least about 50 ppm. The catalyst concentration is also typically present in an amount of less than or equal to 120 ppm, or of less than or equal to 90 ppm, or of less than or equal to 75 ppm. Suitable catalyst concentrations range from 30 ppm to 120 ppm, or from 45 ppm to 90 ppm, from 50 to 75 ppm, based on the weight of the polyether polyol produced. The crystalline and the substantially non-crystalline DMC catalysts may be present in an amount ranging between any combination of these values, inclusive of the recited values.

In accordance with the invention, when additional DMC catalyst is added with the continuously added starter ($S_c$), this additional DMC catalyst can be fresh catalyst that is not activated. The fresh catalyst can be (i) mixed in the continuous starter feed and added, or (ii) mixed into a low molecular weight polyoxyalkylene polyol and the mixture added as a separate feed stream to the reactor, or (iii) added as a concentrate to a continuous starter feed and added as a separate feed stream to the reactor.

The additional catalyst can also be pre-activated in a low molecular weight polyoxyalkylene polyol and either (i) added as a separate feed stream, or (ii) mixed with the CAOS feed.

Suitable compounds to be used as the initial starter compounds ($S_i$) include compounds which have hydroxyl numbers of from 200 to 500 and hydroxyl functionalities of at least about 2 up to about 8, and preferably from about 2 to about 6. Suitable compounds to be used as the initial starter herein include low molecular weight polyoxyalkylene polyols having the specified hydroxyl numbers and a "heel" from a prior polyether polyol preparation. For example, one may make a 200 equivalent weight polyether polyol (i.e. diol) by DMC catalysis, then dump or remove 90% of the product from the reactor. The remaining 10% of the product can be left in the reactor and used as the initial starter for preparing another batch of 200 equivalent weight polyether polyol (400 molecular weight diol) or another higher equivalent weight polyether polyol (e.g. 500 molecular weight diol). The product which remains in the reactor from the previous preparation is commonly referred to as a "heel".

Suitable low molecular weight polyoxyalkylene polyols to be used as initial starters ($S_i$) comprise the alkoxylation products of low molecular weight compounds such as, for example, ethylene glycol, propylene glycol, butylene glycol, glycerine, diethylene glycol, dipropylene glycol, tripropylene glycol, trimethylolpropane, pentaerythritol, sucrose, sorbitol, etc. These initial starters may be base catalyzed low molecular weight polyoxyalkylene polyols or DMC catalyzed low molecular weight polyoxyalkylene polyols.

When using base catalyzed low molecular weight polyoxyalkylene polyols as the initial starter ($S_i$), the base catalyst should be removed using techniques known to those skilled in the art. Such techniques include but are not limited to acid neutralization followed by filtration, use of adsorbents (acidified clay, magnesium silicate) followed by filtration, ion exchange and over-neutralization with acid of the base catalyzed starter with or without salt removal.

When using DMC catalyzed low molecular weight polyoxyalkylene polyols as the initial starter ($S_i$), a portion of or the total amount of catalyst required for the product can be included during the production of the low molecular weight polyoxyalkylene polyol to be used as the initial starter. When a significant portion (>50 wt. % required in final product) of the catalyst required for the subsequent product step is added in making the low molecular weight polyoxyalkylene oxide starter polyol, storage of the starter polyol with the activated DMC catalyst may be required. The starter polyol with activated DMC catalyst should be inhibited with 200 to 500 ppm BHT or equivalent, acidified with 5 to 100 ppm phosphoric acid and stored in a nitrogen blanked vessel. The temperature of the low molecular weight polyoxyalkylene oxide starter polyol containing activated DMC catalyst should not exceed 100° C. for greater than 72 hours.

Preferred initial starter compounds ($S_i$) are heels (i.e. a previously prepared polyol product), and polyols having a functionality of 2 to 8 and a hydroxyl number of 200 to 500. In one embodiment, the initial starter ($S_i$) has the same or lower molecular weight as the final product.

Starter compounds ($S_i$) may also be referred to as initiators.

The suitable starter compounds for the initial starter ($S_i$) may also be described as compounds having a nominal functionality of from 2 to 8. These initial starters are characterized by an equivalent weight of 56, or at least about 75, or at least about 100, or at least about 150. The initial starter compound is also typically characterized by an equivalent weight of less than or equal to about 560, or less than or equal to about 500, or less than or equal to about 400, or less than or equal to about 300. Typically, the initial starter compound has an equivalent weight of from at least about 56 to less than or equal to about 560, or from at least about 75 to less than or equal to about 500, or from at least about 100 to less than or equal to about 400, or at least about 150 to less than or equal to about 300.

Alkylene oxides useful in the present invention include, but are not limited to, ethylene oxide, propylene oxide, 1,2- and 2,3-butylene oxide, isobutylene oxide, epichlorohydrin, cyclohexene oxide, and styrene oxide. In addition to the alkylene oxide block(s), carbon dioxide can be added in combination with the alkylene oxide(s) to form polyether carbonate polyols.

The first alkylene oxide block suitable for the present invention comprises from 50 to 100% by weight of propylene oxide and from 0 to 50% by weight of ethylene oxide. The sum of the %'s by weight of propylene oxide and ethylene oxide total 100% by weight of the first alkylene oxide block. The propylene oxide to ethylene oxide weight ratio of the first alkylene oxide block can also range from 60 to 95% by weight of propylene oxide to 40 to 5% by weight of ethylene oxide, or from 80 to 90% by weight propylene oxide to 20 to 10% by weight ethylene oxide.

The second alkylene oxide block suitable for the present invention comprises from 50 to 100% by weight of propylene oxide and from 0 to 50% by weight of ethylene oxide. The sum of the %'s by weight of propylene oxide and ethylene oxide total 100% by weight of the second alkylene oxide block. The propylene oxide to ethylene oxide weight ratio may also range from 60 to 95% by weight of propylene oxide to 40 to 5% by weight of ethylene oxide, or from 80 to 90% by weight of propylene oxide to 20 to 10% by weight of ethylene oxide.

In accordance with the invention, the first alkylene oxide block and the second alkylene oxide block will typically have the same or similar weight ratio of propylene oxide to ethylene oxide. A change in the alkylene oxide ratio is an indication that the addition of the third alkylene oxide block has occurred. Thus, as used herein, a block is defined as having a constant PO/EO ratio.

It is well known that activation of a DMC catalyst requires an initial starter and an initial charge of a first alkylene oxide block. Upon heating and charging the alkylene oxide, the pressure in the reactor/system initially increases, and then decreases. The decrease in pressure is an indication that the DMC catalyst is active.

It is also known that the continuous addition of starter (CAOS) feed to the reactor/system also results in the pressure increasing at first, and then decreasing.

In accordance with the present invention, the addition of the third alkylene oxide block may be started after the pressure in the reactor or system decreases after initially increasing after starting the continuous addition of starter ($S_c$). In accordance with the invention, the third alkylene oxide block can be started at any point after beginning the continuous addition of starter ($S_c$) and prior to completing the continuous addition of starter ($S_c$). Suitable weight ratios of propylene oxide to ethylene oxide include, for example, from 90 to 100% by weight of propylene oxide to 10 to 0% by weight of ethylene oxide, or from 95 to 100% by weight propylene oxide to 5 to 0% by weight ethylene oxide.

In another embodiment of the invention, a third alkylene oxide block is added to the reactor. This third alkylene oxide block comprises from 90% to 100% by weight of propylene oxide and from 10% to 0% by weight of ethylene oxide, with the sum of the % by weight of propylene oxide and of the % by weight of ethylene oxide totaling 100% by weight of the third alkylene oxide block. This composition of the third alkylene oxide block may comprise from 95% to 100% by weight of propylene oxide and from 5% to 0% by weight of ethylene oxide, with the sum of the % by weight of propylene oxide and of the % by weight of ethylene oxide totaling 100% by weight of the third alkylene oxide block. The addition of the second alkylene oxide block and when present, the third alkylene oxide block are completed with a space time yield of greater than or equal to 250 kg/m$^3$/hr.

The transition from the second alkylene oxide block to the third alkylene oxide block can be instantaneous or stepwise. If the oxide addition in the second or third alkylene oxide block is interrupted for any reason, the reactor contents can be kept at reaction temperature for up to 36 hours. If the interruption lasts from 36 to 72 hours, the reactor contents should be cooled to 80° C. during the interruption and then heated back to reaction temperature before continuing the addition of the oxide block. If the interruption last longer than 72 hours, the material in the reactor should be drained and the batch restarted.

Suitable compounds to be used as the continuously added starter ($S_c$) include, for example, compounds which have a (nominal) hydroxyl functionality of at least about 2 up to about 8, and preferably from about 2 to about 6, and which have an equivalent weight of up to about 56, and preferably up to about 40. Suitable compounds to be used as the continuous starter herein, include compounds such as, for example, but are not limited to, $C_3$-$C_5$ monols, ethylene glycol, propylene glycol, 1,3-propanediol, 1,4-butanediol, 1,2-butanediol, 1,3-butanediol, 2,3-butanediol, water, glycerin, sorbitol, sucrose, etc. Mixtures of monomeric initiators or their oxyalkylated oligomers may also be utilized.

Preferred continuous starter compounds ($S_c$) are propylene glycol and glycerin. Glycerin is the most preferred continuous starter compound.

The continuous starters ($S_c$) can be acidified with a small amount of a suitable acid as described in, for example, U.S. Pat. No. 6,077,978 and U.S. Pat. No. 7,919,575. The acid may be any inorganic protic mineral acid or organic acid which is known to be suitable as described in the art. Typically, the amount of acid to be added to the continuous starter ranges from 30 to 250 ppm, based on the weight of the continuous starter. In one embodiment, the continuous starter ($S_c$) contains from 120 to 240 ppm of acid. Phosphoric acid is an example of a suitable acid.

The feed of the combined second and third alkylene oxide blocks are completed with a space time yield of greater than or equal to 250 kg/m$^3$/hr, or greater than or equal to 275 kg/m$^3$/hr, or greater than or equal to 300 kg/m$^3$/hr, or, greater than or equal to 400 kg/m$^3$/hr.

The low molecular weight polyoxyalkylene polyols prepared by the presently claimed process typically have hydroxyl numbers of at least 200, or of at least 250, or of at least 300. These low molecular weight polyoxyalkylene polyols prepared by the process of the present invention also typically have hydroxyl numbers of less than or equal to 500, or of less than or equal to 400, or of less than or equal to 350. Thus, the polyoxyalkylene polyols formed by the present process may have hydroxyl numbers in the range of from 200 to 500, preferably of from 250 to 400 and more preferably of from 300 to 350. These polyoxyalkylene polyols typically have a nominal functionality of at least 2. The nominal functionality of these polyoxyalkylene polyols is typically less than or equal to 8, or less than or equal to 6, or less than or equal to 3. These polyoxyalkylene polyols typically have functionalities in the range of from 2 to 8, or of from 2 to 6, or of from 2 to 3.

The low molecular weight polyoxyalkylene polyols prepared by the presently claimed process typically have instantaneous continuous starter ($S_c$) to alkylene oxide ratio during the reaction of from 0.15 to 0.40. The continuous starter ($S_c$) is the total weight of continuous starter ($S_c$) to be fed and the alkylene oxide in this ratio is the amount of alkylene oxide to be fed with the continuous starter feed. This ratio is affected by the initial starter hydroxyl number, the final product hydroxyl number, the amount of alkylene oxide fed in the first alkylene oxide block, the amount of alkylene oxide fed in second alkylene oxide block before starting the continuous starter feed and the amount of alkylene oxide fed in the second and/or third alkylene oxide blocks after the continuous starter feed is stopped.

In accordance with the present invention, the process is typically carried out in a stainless steel reaction vessel (e.g. 35 Liter or larger) equipped with an electrically heated jacket and an internal coil that can be used for heating or cooling the reaction mixture. Steam, water or a combination of the two can be passed through cooling coil to control the reaction temperature. Tempered water or a hot oil system can also be used to control the temperature. The reactor system includes a mechanical agitator that can be equipped with a single agitating device such as a gate-type mixer or an anchor type mixer or other such devices know to those skilled in the art. The agitator could also be equipped with one or multiple mixers such as pitched blade impeller, Rushton-type impeller, flat blade, curved blade, tilted blade or other such devices know to those skilled in the art. The blades can be used individually or in combination. The agitator speed can be constant or vary during the batch. The reactor internals includes baffles. The reactor can also be equipped with a recirculation pump loop that withdraws the reaction mixture from the bottom portion of the reactor and pumps the reaction mixture back into the reactor through a dip tube or spray nozzle in the upper part of the reactor or through a dip tube or sparge ring at the bottom part of the reactor. The recirculation loop can include a heat exchanger for temperature control or can include a static mixing device. The reactor and associated metering and monitoring equipment are connected to digital process control system.

The reactor system includes an oxide dosing system for one or more oxide feeds (i.e. propylene and/or ethylene oxide). The oxides can be introduced to the reactor together or separately. They can be mixed and fed in together or they can be stored separately and mixed using a static mixing device before being introduced to the reactor. The oxides can be introduced into the headspace of the reactor through a dip tube or spray nozzle or into the liquid phase in the reactor through a dip tube or sparge ring. The mixing impellers can be optimized to match the location of oxide addition to provide a high shear/mixing zone near the oxide injection location. The oxides can also be introduced to the recirculation line directly or via a static mixing device.

The low molecular weight starters (i.e. glycerin, propylene glycol) that are added continuously during the batch are stored under a nitrogen blanket. The starters can be acidified with 0-240 ppm phosphoric acid or equivalent. The starters can be mixed in the feed vessel and fed in together or they can be stored separately and fed in separately. When stored separately they can be mixed together before entering the reactor and introduced into the reaction mixture together or with the oxide feed. The continuous starter feed can be added into the headspace of the reactor with a dip pipe or spray nozzle, or the starter feed can be added to the liquid phase in the reactor via a dip pipe or a sparge ring, or the starter feed can be introduced into recirculation line either directly or via a static mixing device. The continuous starter can be added at a single location or multiple locations, and the number and location of the dosing location can change throughout the batch. The location of the entry point or points should be optimized with the mixing in the vessel.

As will be appreciated by the foregoing description, the present invention is directed, in certain embodiments, to a semi-batch process for the production of low molecular weight polyoxyalkylene polyols which have hydroxyl numbers of from 200 to 500, that comprises (1) establishing a mixture of a double metal cyanide catalyst and an initial starter in a reactor; (2) activating the double metal cyanide catalyst with a first alkylene oxide block that comprises from 50% to 100% by weight of propylene oxide and 0% to 50% by weight of ethylene oxide, wherein the sum of the % by weight of propylene oxide and the % by weight of ethylene oxide totals 100% by weight of the first alkylene oxide block; (3) adding a second alkylene oxide block into the reactor, wherein the second alkylene oxide block comprises from 50% to 100% by weight of propylene oxide and 0% to 50% by weight of ethylene oxide, wherein the sum of the % by weight of propylene oxide and the % by weight of ethylene oxide totals 100% by weight of the second alkylene oxide block; (4) continuously introducing one or more starters into the reactor; (5) optionally, adding a third alkylene oxide block into the reactor, wherein the third alkylene oxide block comprises from 95% to 100% by weight of propylene oxide and from 5% to 0% by weight of ethylene oxide, wherein the sum of the % by weight of propylene oxide and the % by weight of ethylene oxide totals 100% by weight of the third alkylene oxide block; (6) oxyalkylating the starters to form the low molecular weight polyoxyalkylene polyols; and (7) completing the addition of the second alkylene oxide block which was started in (3), and, when present, of the third alkylene oxide block, with a space time yield of greater than or equal to 250 kg/m$^3$/hr.

In certain embodiments, the present invention is directed to the semi-batch process for the production of low molecular weight polyoxyalkylene polyols of the previous paragraph, wherein the content of ethylene oxide in the first alkylene oxide block and in the second alkylene oxide block is greater than the content of ethylene oxide in the third alkylene oxide block.

In certain embodiments, the present invention is directed to the semi-batch process for the production of low molecular weight polyoxyalkylene polyols of the previous two paragraphs, wherein the ethylene oxide feed is stopped when the total alkylene oxide added in step (3) ranges from 10 to 20% of the total alkylene oxide added to the entire process and the process is completed with 100% propylene oxide.

In certain embodiments, the present invention is directed to the semi-batch process for the production of low molecular weight polyoxyalkylene polyols of the previous three paragraphs, wherein at least one of the first alkylene oxide block and the second alkylene oxide block comprises a minimum of 5% by weight of ethylene oxide.

In certain embodiments, the present invention is directed to the semi-batch process for the production of low molecular weight polyoxyalkylene polyols of the previous four paragraphs, wherein the second alkylene oxide block comprises from 50 to 95% by weight of propylene oxide and from 5 to 50% by weight of ethylene oxide, and the sum of the % by weight of propylene oxide and the % by weight of ethylene oxide totals 100% by weight of the second alkylene oxide block.

In certain embodiments, the present invention is directed to the semi-batch process for the production of low molecular weight polyoxyalkylene polyols of the previous five paragraphs, wherein the weight of continuous starter ($S_c$) to the weight of the second alkylene oxide block and the third alkylene oxide block when present is such that the ratio of continuous starter to the alkylene oxides is instantaneously within the range of 0.15 to 0.40.

In certain embodiments, the present invention is directed to the semi-batch process for the production of low molecular weight polyoxyalkylene polyols of the previous six paragraphs, wherein steps (3) and (4) are conducted simultaneously.

In certain embodiments, the present invention is directed to the semi-batch process for the production of low molecular weight polyoxyalkylene polyols of the previous seven paragraphs, wherein steps (4) and (5) are conducted simultaneously.

In certain embodiments, the present invention is directed to the semi-batch process for the production of low molecular weight polyoxyalkylene polyols of the previous eight paragraphs, the composition of the second alkylene oxide block is the same as that of the first alkylene oxide block.

In certain embodiments, the present invention is directed to the semi-batch process for the production of low molecular weight polyoxyalkylene polyols of the previous nine paragraphs, wherein after the pressure decreases following the continuous introduction of one or more starters ($S_c$), a third alkylene oxide block having a different composition than the first and second alkylene oxide blocks is added.

In certain embodiments, the present invention is directed to the semi-batch process for the production of low molecular weight polyoxyalkylene polyols of the previous ten paragraphs, wherein the first alkylene oxide block and the second alkylene oxide block both comprise 100% of propylene oxide.

In certain embodiments, the present invention is directed to the semi-batch process for the production of low molecular weight polyoxyalkylene polyols of the previous eleven paragraphs, wherein the first alkylene oxide block comprises a mixture of propylene oxide to ethylene oxide in a weight ratio of 95:5 to 80:20, and the second alkylene oxide block has the same propylene oxide to ethylene oxide weight ratio until at least 10% of the oxide feed, based on target amount of oxide required, is completed.

In certain embodiments, the present invention is directed to the semi-batch process for the production of low molecular weight polyoxyalkylene polyols of the previous twelve paragraphs, wherein the initial starter comprises a heel from a previous product.

In certain embodiments, the present invention is directed to the semi-batch process for the production of low molecular weight polyoxyalkylene polyols of the previous thirteen paragraphs, wherein the addition of the second and third alkylene oxide block is completed with a space time yield of greater than or equal to 275 kg/m$^3$/hr.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

The examples herein were carried out in a 35 Liter stainless steel reaction vessel equipped with an electrically heated jacket and an internal coil that can be used for cooling the reaction mixture using water. The reactor is equipped with baffles and an agitator that contains a Ruston type agitator at the bottom and pitched blade in the upper portion. The oxide and continuous starter feed are introduced into the liquid phase using dip pipes.

The following compounds or materials were used in the examples.

Catalyst A: A double metal cyanide catalyst prepared according to the procedure in U.S. Pat. No. 5,482,908.

Polyol A: a glycerin started poly(oxypropylene) polyol having a hydroxyl number of about 238 mgKOH/g made using KOH catalyst, with the KOH being removed by methods known to those skilled in the art. The final polyol is inhibited with BHT or equivalent and acidified with phosphoric acid or equivalent.

Comparative Example 1

To the 35 L reactor described above 2500 grams of Polyol A and 0.6 grams of Catalyst A were charged. This mixture was heated to 130° C. Vacuum was applied to a level of 0.1 psia and nitrogen was introduced via a dip tube to the liquid phase for 30 minutes. Propylene oxide (125 g) was charged to activate the catalyst. The pressure increased to 15 psia and then steadily decreased, thus indicating that the catalyst was active. When the pressure reached 3 psia, the PO feed was restarted and ramped to 89.1 g/min over 30 minutes. After 125 grams of PO were fed to the reactor (i.e. pre-CAOS charge), the glycerin and propylene glycol feeds were started. The glycerin was fed at a Gly/PO ratio of 14.25 wt % and the PG was fed at a PG/PO ratio of 8.55%. The total CAOS/PO ratio was 22.8%. This corresponds to an instantaneous hydroxyl number of 315 mg KOH/g. The pressure in the batch rapidly increased to 80 psia with minimal cooling demand, thus indicating that the propylene oxide was not being reacted away. At this point, the PO and continuous starter ($S_c$) feeds were stopped. The pressure remained at 80 psia indicating a loss in catalyst activity. A total of 27 moles of oxide were fed to the reactor to reach the 80 psia level.

Example 1

To the 35 L reactor described above 2500 grams of Polyol A and 0.6 grams of Catalyst A were charged. This mixture was heated to 130° C. Vacuum was applied to a level of 0.1 psia and nitrogen was introduced via a dip tube or to the liquid phase for 30 minutes. Propylene oxide (75 g) and ethylene oxide (50 g) were charged to activate the catalyst. The pressure increased to 15 psia and then steadily decreased indicating the catalyst was active. When the pressure reached 3 psia the PO feed was restarted and ramped to 53.1 g/min over 30 minutes. Simultaneously, the EO fed was restarted and ramped to 36 g/min. The total combined PO+EO feed rate was 89.1 g/min. After 100 grams of PO were fed the glycerin and propylene glycol feeds were started. The glycerin was fed at a Gly/Oxide (PO+EO) ratio of 14.25 wt % and the PG was fed at a PG/Oxide (PO+EO) ratio of 8.55%. The total CAOS/Oxide ratio was 22.8%. This corresponds to an instantaneous hydroxyl number of 315 mg KOH/g. The pressure in the batch increased to 23 psia and then decreased to 20 psia after 10% of the total oxide was fed. At this point the EO feed was stopped and the PO feed was increased to 89.1 g/min. The Glycerin and PG feeds remained constant at the 22.8% CAOS/Oxide ratio (PO only at this point). After 60% of the oxide was fed the pressure reached 80 psia with minimal cooling demand indicating that the propylene oxide was not being reacted away. At this point the PO and continuous starter feeds were stopped. The pressure remained at 80 psia indicating a loss in catalyst activity. A total of 151 moles of oxide were fed to the reactor to reach the 80 psia level.

TABLE 1

Effect of EO on first and second alkylene oxide blocks

| | Example | |
|---|---|---|
| | C1 | 1 |
| 1$^{st}$ PO:EO Ratio | 100% PO | 60% PO:40% EO |
| 2$^{nd}$ PO:EO Ratio | 100% PO | 60% PO:40% EO |
| 3$^{rd}$ PO:EO Ratio | 100% PO | 100% PO |
| Time Required for Catalyst Activation | 20 mins | 23 mins |
| Time After Catalyst Activation to Change to 3$^{rd}$ PO:EO Ratio | NA | 32 mins |

TABLE 1-continued

Effect of EO on first and second alkylene oxide blocks

| | Example | |
|---|---|---|
| | C1 | 1 |
| Moles of Oxide Fed Prior to Shutdown | 27 moles | 151 moles |
| Time to Reactor Shutdown (After Catalyst Activation) | 30 mins | 117 mins |
| Final Reactor Pressure | 80 psia | 80 psia |

Example 1 demonstrates that by using ethylene oxide with propylene oxide during the first and second alkylene oxide blocks at the start of the reaction provides a lower pressure after the start of the CAOS feed allowing the reaction to proceed further and switch to the third alkylene oxide block before losing activity at a relatively low catalyst level. Example 1 reaction conditions with PO/EO feeds during the first alkylene oxide block and the second alkylene oxide block followed by all-PO in the third alkylene oxide block consumed 151 moles of oxide compared to only 27 moles in Comparative Example 1 that fed only propylene oxide for alkylene oxide blocks 1 and 2.

General Method for Low Molecular Weight Polyether Preparation Via a Semi-Batch Continuous Addition of Starter Process:

The initial starter ($S_i$) was charged to the reactor along with a double metal cyanide catalyst (Catalyst A). Agitation was in the range of 0.6 to 2.4 kW/m$^3$. The mixture was heated to 130° C. with nitrogen stripping under vacuum for 30 to 60 minutes. The alkylene oxide was charged to the reactor at the target ratios for activation of the catalyst. Activation of the catalyst was completed with a 6-10 wt. % oxide charge (based on the initial starter ($S_i$) weight). After the pressure decreased the oxide feeds were restarted at the target ratio and ramped to the peak feed rates. The continuous starter ($S_c$) was started after a given wt. % of the total oxide weight was added (range from 0.0 to 5% of the total oxide weight, i.e. pre-CAOS charge). After the $S_c$ feed started the pressure increased and then decreased again indicating the inhibitory nature of the $S_c$ feed on the catalyst and the re-activation of the catalyst. This pressure increase after the $S_c$ was started is documented as $P_i$ in the Tables below. The $S_c$ continued to feed until the total amount of $S_c$ was fed. In one embodiment, the total amount of $S_c$ was reached before the oxide feed ends (range from 80 to 100% of the total oxide feed). The pressure during the run decreased from $P_i$ and then began to increase again. This increase was caused by the reactor fill increasing but also demonstrated the activity of the catalyst at the end of the batch. The maximum pressure in the batch typically occurs just after the $S_c$ feed was completed. This pressure is given as $P_{max}$ in the Tables below. The oxide feed continued until the total oxide weight is met. The pressure decreased after $P_{max}$ indicating the $S_c$ starter was consumed and catalyst was no longer inhibited by the $S_c$. The pressure decreased to a final pressure at the end of the oxide feed. This pressure is designated as $P_{cook}$ in the Tables below. After the oxide feed was finished nitrogen was introduced through the oxide feed dip tube to remove all residual oxide from the feed line and the remaining oxide was allowed to cookout at reaction temperature. The pressure at the point where the cookout was complete or when the pressure was constant is given as $P_{cook\ end}$ in the Tables below. The cookout time is also noted. The final polyether product was stripped with steam and/or nitrogen and vacuum before being discharged from the reactor. The final product was inhibited with BHT (butylhydroxytoluene) or equivalent and acidified with phosphoric acid or equivalent if required.

TABLE 2

Examples made with 80/20 PO/EO ratio in the first and the second alkylene oxide blocks.

|  | Example | | | | |
|---|---|---|---|---|---|
|  | 2 | 3 | 4 | 5 | C2 |
| Initial Starter ($S_i$) - Polyol A (g) | 2500 | 2500 | 2500 | 2500 | 2500 |
| Continuous Starter ($S_c$) - Glycerine (g)* | 2279 | 2279 | 2279 | 2279 | 2279 |
| Total PO in oxide 1 (g) | 160 | 160 | 160 | 160 | 160 |
| Total EO in oxide 1 (g) | 40 | 40 | 40 | 40 | 40 |
| Total PO in oxide 2 (g) | 12017 | 12017 | 12017 | 12017 | 12017 (target) |
| Total EO in oxide 2 (g) | 3004 | 3004 | 3004 | 3004 | 3004 (target) |
| Wt % oxide fed when $S_c$ starts | 4.1 | 4.1 | 4.1 | 4.1 | 4.1 |
| Wt % oxide fed when $S_c$ stops | 86.9 | 86.9 | 86.9 | 86.9 | 86.9 (target) |
| Catalyst A in Starter $S_i$, ppm | 480 | 480 | 480 | 480 | 480 |
| Catalyst A in Final Product, ppm | 60 | 60 | 60 | 60 | 60 |
| Agitation (kW/m³) | 1.6 | 1.6 | 1.6 | 1.6 | 1.6 |
| Feed Time (hr) | 2.5 | 2.5 | 4 | 4 | 6 |
| Ramp up (min) | 20 | 20 | 20 | 20 | 20 |
| Peak Feedrate (g/min) | 107.29 | 107.29 | 65.31 | 65.31 | 42.92 |
| Space Time Yield (kg/m³/hr) | 400 | 400 | 250 | 250 | 166.7 (target) |
| $S_c$/Oxide wt % | 18.1 | 18.1 | 18.1 | 18.1 | 18.1 |
| $P_i$ | 24.5 | 29.8 | 19.1 | 43.1 | 17.4 |
| $P_{max}$ | 27.2 | 33.6 | 54.5 | 54.3 | 73.9 |
| $P_{cook}$ | 11.9 | 17.7 | 42.6 | 40.9 | ** |
| $P_{cook\ end}$ | 10.4 | 18.1 | 9.1 | 13.9 | ** |
| Cook Time | 11 | 8 | 53 | 40 | ** |
| Wt % oxide fed when oxide feeds stopped | 100 | 100 | 100 | 100 | 80 |
| OH# (mg KOH/g) | 241 | 240 | 242 | 243 | ND |
| Viscosity (cSt) | 243 | 240 | 246 | 247 | ND |
| MW distribution dispersity | 1.096 | 1.084 | 1.091 | 1.127 | ND |

*Glycerine acidified with 240 ppm phosphoric acid
** Reaction stopped no cookout The examples in Table 2 demonstrate that a higher space time yield is beneficial to the operability of the batch and to the activity of the catalyst. This is demonstrated by the lower $P_{max}$, $P_{cook}$ and faster cookout times of Examples 2 and 3 compared to Examples 4 and 5. Comparative Example 2 had a low initial $P_i$ after the $S_c$ started but lost catalyst activity during the batch.

TABLE 3

Examples made with all-PO in the first and second alkylene oxide blocks and intermediate space time yields.

|  | Example | | | |
|---|---|---|---|---|
|  | 6 | 7 | 8 | 9 |
| Initial Starter ($S_i$) - Polyol A (g) | 2500 | 2500 | 2500 | 2500 |
| Continuous Starter ($S_c$) - Glycerine (g)* | 2958 | 2958 | 2958 | 2958 |
| Total PO in oxide 1 (g) | 200 | 200 | 200 | 200 |
| Total EO in oxide 1 (g) | 0 | 0 | 0 | 0 |
| Total PO in oxide 2 (g) | 14342 | 14342 | 14342 | 14342 (target) |
| Total EO in oxide 2 (g) | 0 | 0 | 0 | 0 |
| Wt % oxide fed when $S_c$ starts | 4.3 | 4.3 | 4.3 | 4.3 |
| Wt % oxide fed when $S_c$ stops | 86.2 | 86.2 | 86.2 | 86.2 (target) |
| Catalyst A in Starter $S_i$, ppm | 480 | 480 | 480 | 480 |
| Catalyst A in Final Product, ppm | 60 | 60 | 60 | 60 |
| Agitation (kW/m³) | 1.6 | 1.6 | 1.6 | 1.6 |
| Feed Time (hr) | 4 | 4 | 4 | 4 |
| Ramp up (min) | 20 | 20 | 20 | 20 |
| Peak Feedrate (g/min) | 62.36 | 62.36 | 62.36 | 62.36 |
| Space Time Yield (kg/m³/hr) | 250 | 250 | 250 | 250 |
| $S_c$/Oxide wt % | 24.8 | 24.8 | 24.8 | 24.8 |
| $P_i$ | 28.1 | 27.6 | 28.2 | 32.7 |
| $P_{max}$ | 56 | 51 | 49.2 | 75 |
| $P_{cook}$ | 54.7 | 50.5 | 48.4 | ** |
| $P_{cook\ end}$ | 8.2 | 8 | 10.1 | ** |
| Cook Time | 60 | 60 | 60 | ** |

TABLE 3-continued

Examples made with all-PO in the first and second alkylene oxide blocks and intermediate space time yields.

|  | Example | | | |
|---|---|---|---|---|
|  | 6 | 7 | 8 | 9 |
| Wt % oxide fed when oxide feeds stopped | 100 | 100 | 100 | 87.1 |
| OH# (mg KOH/g) | 298.1 | 298 | 296 | ND |
| Viscosity (cSt) | 305 | 305 | 306 | ND |
| MW distribution dispersity | 1.142 | 1.141 | 1.142 | ND |

*Glycerine acidified with 240 ppm phosphoric acid
** Reaction stopped no cookout

TABLE 4

Examples made with all-PO in the first and second alkylene oxide blocks and high space time yields.

|  | Example | | | | |
|---|---|---|---|---|---|
|  | 10 | 11 | 12 | 13 | 14 |
| Initial Starter ($S_i$) - Polyol A (g) | 2500 | 2500 | 2500 | 2500 | 2500 |
| Continuous Starter ($S_c$) - Glycerine (g)* | 2958 | 2958 | 2958 | 2958 | 2958 |
| Total PO in oxide 1 (g) | 200 | 200 | 200 | 200 | 200 |
| Total EO in oxide 1 (g) | 0 | 0 | 0 | 0 | 0 |
| Total PO in oxide 2 (g) | 14342 | 14342 | 14342 | 14342 | 14342 |
| Total EO in oxide 2 (g) | 0 | 0 | 0 | 0 | 0 |
| Wt % oxide fed when $S_c$ starts | 4.3 | 4.3 | 4.3 | 4.3 | 4.3 |
| Wt % oxide fed when $S_c$ stops | 86.2 | 86.2 | 86.2 | 86.2 | 86.2 |
| Catalyst A in Starter $S_i$, ppm | 480 | 480 | 480 | 480 | 480 |
| Catalyst A in Final Product, ppm | 60 | 60 | 60 | 60 | 60 |
| Agitation, (kW/m$^3$) | 1.6 | 1.6 | 1.6 | 1.6 | 1.6 |
| Feed Time (hr) | 2.5 | 2.5 | 2.5 | 2.4 | 2.8 |
| Ramp up (min) | 20 | 20 | 20 | 5 | 50 |
| Peak Feedrate (g/min) | 102.45 | 102.45 | 102.45 | 101.36 | 100.3 |
| Space Time Yield (kg/m$^3$/hr) | 400 | 400 | 400 | 417 | 357 |
| $S_c$/Oxide wt % | 24.8 | 24.8 | 24.8 | 24.8 | 24.8 |
| $P_i$ | 41 | 44.2 | 42.4 | 45.8 | 44.4 |
| $P_{max}$ | 44.4 | 44.1 | 26.6 | 42.4 | 53.5 |
| $P_{cook}$ | 37.6 | 37.1 | 22.7 | 34.3 | 46.5 |
| $P_{cook\ end}$ | 8.3 | 10.5 | 11.7 | 8.5 | 23.4 |
| Cook Time | 29 | 35 | 24 | 30 | 27 |
| Wt % oxide fed when oxide feeds stopped | 100 | 100 | 100 | 100 | 100 |
| OH# (mg KOH/g) | 294 | 295 | 291 | 299 | 302 |
| Viscosity (cSt) | 303 | 305 | 303 | 304 | 303 |
| MW distribution dispersity | 1.142 | 1.134 | 1.106 | 1.13 | 1.13 |

*Glycerine acidified with 240 ppm phosphoric acid

TABLE 5

Examples made with all-PO in the first and second alkylene oxide blocks and low space time yield.

|  | Example | | | | |
|---|---|---|---|---|---|
|  | C3 | C4 | C5 | C6 | 15 |
| Initial Starter ($S_i$) - Polyol A (g) | 2500 | 2500 | 2500 | 2500 | 2500 |
| Continuous Starter ($S_c$) - Glycerine (g)* | 2958 | 2958 | 2958 | 2958 | 2958 |
| Total PO in oxide 1 (g) | 200 | 200 | 200 | 200 | 200 |
| Total EO in oxide 1 (g) | 0 | 0 | 0 | 0 | 0 |
| Total PO in oxide 2 (g) | 14342 | 14342 | 14342 | 14342 | 14342 |
| Total EO in oxide 2 (g) | 0 | 0 | 0 | 0 | 0 |

TABLE 5-continued

Examples made with all-PO in the first and second alkylene oxide blocks and low space time yield.

| | Example | | | | |
|---|---|---|---|---|---|
| | C3 | C4 | C5 | C6 | 15 |
| Wt % oxide fed when $S_c$ starts | 4.3 | 4.3 | 4.3 | 4.3 | 4.3 |
| Wt % oxide fed when $S_c$ stops | 86.2 | 86.2 | 86.2 | 86.2 | 86.2 |
| Catalyst A in Starter $S_i$, ppm | 480 | 480 | 480 | 480 | 480 |
| Catalyst A in Final Product, ppm | 60 | 60 | 60 | 60 | 60 |
| Agitation, (kW/m$^3$) | 1.6 | 1.6 | 1.6 | 1.6 | 1.6 |
| Feed Time (hr) | 6 | 6 | 6 | 5.2 | 3.2 |
| Ramp up (min) | 20 | 20 | 20 | 20 | 20 |
| Peak Feedrate (g/min) | 40.98 | 40.98 | 40.98 | 102.45, 40.98 | 40.98, 102.45 |
| Space Time Yield (kg/m$^3$/hr) | 167 | 167 | 167 | 192 | 312 |
| $S_c$/Oxide wt % | 24.8 | 24.8 | 24.8 | 24.8 | 24.8 |
| $P_i$ | 18.2 | 19.7 | 20.7 | 57 | 19.9, 35 |
| $P_{max}$ | 75 | 75 | 75 | 75 | 46 |
| $P_{cook}$ | ** | ** | ** | ** | 37.3 |
| $P_{cook\ end}$ | ** | ** | ** | ** | 9.1 |
| Cook Time | ** | ** | ** | ** | 25 |
| Wt % oxide fed when oxide feeds stopped | 86.3 | 85 | 87 | 87.6 | 100 |
| OH# (mg KOH/g) | ND | ND | ND | ND | 301 |
| Viscosity (cSt) | ND | ND | ND | ND | 303 |
| MW distribution dispersity | ND | ND | ND | ND | 1.13 |

*Glycerine acidified with 240 ppm phosphoric acid
** Reaction stopped no cookout The examples in Tables 3, 4 and 5 demonstrate that with an all-propylene oxide feed in the first and second blocks that a higher space time yield or a shorter feed time gives a more active system as indicated by a lower $P_{max}$, $P_{cook}$ and shorter cook out time, similar to the examples with EO in the first and second block in Table 2. The examples attempted at lower space time yields were not able to be completed. Example 15 and Comparative Example 6 use different feed rates during the batch. Comparative Example 6 fed PO at the equivalent of the 2.5 hour rate for the first 25 wt. % of the PO and then the PO feed rate is changed to the equivalent of the 6 hr feed rate for the remaining feed to give an overall space time yield of 192 kg/m$^3$/hr. Comparative Example 6 lost catalyst activity and could not be completed. Example 15 fed PO at the equivalent of the 6 hour rate of the first 25% of the PO and then the PO feed rate is changed to the equivalent of the 2.5 hour feed rate for the remaining PO for an overall space time yield of 312 kg/m$^3$/hr. The pressure increased after the feeds were increased indicated by the second $P_i$ in Table 5. The feed finished and the cook out was similar to previous batches made with a 2.5 hour feed time for the entire example. Example 15 demonstrates the benefits of the low $P_i$ possible with the slower feed time at the start followed by the benefits of the faster feed time at the end to maintain activity.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A semi-batch process for the production of low molecular weight polyoxyalkylene polyols which have hydroxyl numbers of from 200 to 500, comprising:
   (1) establishing a mixture of a double metal cyanide catalyst and an initial starter in a reactor;
   (2) activating said double metal cyanide catalyst with a first alkylene oxide block that comprises from 50% to 100% by weight of propylene oxide and 0% to 50% by weight of ethylene oxide, wherein the sum of the % by weight of propylene oxide and the % by weight of ethylene oxide totals 100% by weight of said first alkylene oxide block;
   (3) adding a second alkylene oxide block into the reactor, wherein said second alkylene oxide block comprises from 50% to 100% by weight of propylene oxide and 0% to 50% by weight of ethylene oxide, wherein the sum of the % by weight of propylene oxide and the % by weight of ethylene oxide totals 100% by weight of said second alkylene oxide block;
   (4) continuously introducing one or more starters into the reactor;
   (5) optionally, adding a third alkylene oxide block into the reactor, wherein said third alkylene oxide block comprises from 95% to 100% by weight of propylene oxide and from 5% to 0% by weight of ethylene oxide, wherein the sum of the % by weight of propylene oxide and the % by weight of ethylene oxide totals 100% by weight of the third alkylene oxide block;
   (6) oxyalkylating the starters to form the low molecular weight polyoxyalkylene polyols;
   and
   (7) completing the addition of the second alkylene oxide block which was started in (3), and, when present, of the third alkylene oxide block, with a space time yield of greater than or equal to 250 kg/m³/hr.

2. The process of claim 1, wherein said third alkylene oxide block is present and the content of ethylene oxide in said first alkylene oxide block and in said second alkylene oxide block is greater than the content of ethylene oxide in said third alkylene oxide block.

3. The process of claim 1, wherein the ethylene oxide feed when present is stopped when the total alkylene oxide added in step (3) ranges from 10 to 20% of the total alkylene oxide added to the entire process and the process is completed with 100% propylene oxide.

4. The process of claim 1, wherein at least one of said first alkylene oxide block and said second alkylene oxide block comprises a minimum of 5% by weight of ethylene oxide.

5. The process of claim 1, wherein said second alkylene oxide block comprises from 50 to 95% by weight of propylene oxide and from 5 to 50% by weight of ethylene oxide, and the sum of the % by weight of propylene oxide and the % by weight of ethylene oxide totals 100% by weight of said second alkylene oxide block.

6. The process of claim 1, wherein the ratio of continuous starter to said alkylene oxides is instantaneously within the range of 0.15 to 0.40.

7. The process of claim 1, wherein steps (3) and (4) are conducted simultaneously.

8. The process of claim 1, wherein said third alkylene oxide block is present and steps (4) and (5) are conducted simultaneously.

9. The process of claim 1, wherein the composition of the second alkylene oxide block is the same as that of the first alkylene oxide block.

10. The process of claim 1, wherein after the pressure decreases following the continuous introduction of one or more starters ($S_c$), a third alkylene oxide block having a different composition than the first and second alkylene oxide blocks is added.

11. The process of claim 1, wherein said first alkylene oxide block and said second alkylene oxide block both comprise 100% of propylene oxide.

12. The process of claim 1, wherein said first alkylene oxide block comprises a mixture of propylene oxide to ethylene oxide in a weight ratio of 95:5 to 80:20, and said second alkylene oxide block has the same propylene oxide to ethylene oxide weight ratio until at least 10% of the oxide feed, based on target amount of oxide required, is completed.

13. The process of claim 1, wherein said initial starter comprises a heel from a previous product.

14. The process of claim 1, wherein the addition of the second and third alkylene oxide block is completed with a space time yield of greater than or equal to 275 kg/m³/hr.

* * * * *